Patented Apr. 20, 1926.

1,581,340

UNITED STATES PATENT OFFICE.

LUCIEN GOLDENBERG, OF PARIS, FRANCE.

MANUFACTURE OF VACCINES.

No Drawing.   Application filed February 7, 1923. Serial No. 617,609.

*To all whom it may concern:*

Be it known that I, LUCIEN GOLDENBERG, a citizen of the Republic of Russia, residing at Paris, France, Rue La Bruyere No. 31, have invented certain new and useful Improvements in the Manufacture of Vaccines, of which the following is a specification.

This invention relates to a process for obtaining polygenetic and polyvalent vaccines suitable for use against a great number of diseases.

According to this invention microbes of different races and species, sterilized by different processes, are emulsified in an excipient formed of a solution of microbes of the same species and races.

The preparation of these vaccines comprises:

(1) The preparation of the excipient;
(2) The preparation of the microbic bodies;
(3) The emulsification of the microbic bodies in the excipient.

(1) The excipients hitherto employed for emulsifying the microbic bodies are principally physiological serum (sodium chloride solution of 7.5%) or a vegetable oil (lipovaccine).

According to this invention the excipient is prepared by treating the microbes with a bacteriolytic substance and then carefully neutralizing the whole.

The solutions of microbes which have been utilized by my correspondents as excipients are already known, but such solutions prepared by various processes have never been utilized as excipients of vaccines. They have only been prepared with the object of studying the nature of the endotoxins.

The employment of these solutions of microbes as excipients for vaccines is new.

(2) The microbic bodies which are incorporated in the excipient to form the vaccine may be of three types:

(*a*) Microbes killed at a suitable temperature;
(*b*) Microbes killed by cold;
(*c*) Microbes which have been in more or less prolonged contact with a chemical substance capable of sterilizing them and then washed.

(3) The new vaccines may be prepared by emulsifying any one of these types of microbic bodies in the excipient above described but it is preferable when possible to incorporate a mixture of two or three of these types in the excipient. There already exists a very large number of vaccines composed of an emulsion of microbic bodies killed by heat, cold or a chemical agent in an excipient which is usually sodium chloride or oil solution.

But such vaccines, which are sometimes polyvalent and polygenetic, contain only one of the three types of microbic bodies, only those killed by heat or those killed by cold or those sterilized by a chemical agent, but always in one of the usual excipients. None of these consisted of microbes treated by one of these processes, in suspension in an excipient obtained by sterilizing the same microbes.

The following is an example of how the process may be carried out for preparing a vaccine for gonococcic troubles: Fresh cultures of gonococci of different races are first carefully freed from the culture medium by means of repeated washings (at least five washings) and then divided into four portions. The first portion serves for the preparation of the excipient in the following manner: The microbic bodies are emulsified in a soda lye of 3.3% for 24 hours at 37° C., then the whole is exactly neutralized with hydrochloric acid and rendered isotonic by means of sodium chloride.

The second portion is killed by heating at 58° until a test by sowing shows that the microbes have been completely sterilized.

The third is killed by placing it for twenty-four hours in a freezing chamber. A sowing test is then applied.

The fourth is emulsified in a solution of formol at 0.13%. After standing on ice the formol is removed by repeated washings.

The vaccine is obtained by suspending these three in the excipient above described.

In order to render the vaccine polygenetic pure cultures of synococcus (a microbe accompanying the gonococcus in blenhorragia, Nicolle and Blaizot: Comptes rendus, Nov. 24, 1913, p. 1010; Archives de l'Institut Pasteur de Tunis, 1919, Vol. IX, pp. 7 and 8) are subjected to suitable treatment according to the method above described and the vaccine thus obtained is mixed with the gonococcus vaccine above described.

These new vaccines are distinguished from vaccines hitherto known by a much greater specific activity. They are usually applied by subcutaneous injection.

Claims:

1. The art of manufacturing a vaccine which consists in suspending sterilized microbes in an excipient formed of a solution of microbes of the same type and race.

2. The art of manufacturing a vaccine which consists in sterilizing a plurality of microbe cultures by different processes, preparing a solution of microbes of the same type and race, and suspending said sterilized cultures in said solution as an excipient.

3. A vaccine in a form suitable for injection for immunization and curative purposes comprising sterilized cocci suspended in an excipient solution of cocci of the same type and race.

In testimony whereof I affix my signature.

LUCIEN GOLDENBERG.